United States Patent
Harknett et al.

(10) Patent No.: US 9,641,112 B2
(45) Date of Patent: May 2, 2017

(54) PROTECTION METHOD FOR A GENERATOR

(71) Applicant: CLARK EQUIPMENT COMPANY, Statesville, NC (US)

(72) Inventors: Nicholas Harknett, Statesville, NC (US); Dale Herbstritt, Statesville, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 37 days.

(21) Appl. No.: 14/566,273

(22) Filed: Dec. 10, 2014

(65) Prior Publication Data
US 2016/0173016 A1    Jun. 16, 2016

(51) Int. Cl.
| | | |
|---|---|---|
| H02P 11/00 | (2006.01) | |
| H02H 7/06 | (2006.01) | |
| H02P 9/00 | (2006.01) | |
| H02K 3/28 | (2006.01) | |
| H02H 3/08 | (2006.01) | |
| H02H 3/20 | (2006.01) | |
| H02K 1/04 | (2006.01) | |
| H02K 7/20 | (2006.01) | |

(52) U.S. Cl.
CPC ............. *H02P 9/006* (2013.01); *H02H 3/08* (2013.01); *H02H 3/20* (2013.01); *H02H 7/06* (2013.01); *H02K 3/28* (2013.01)

(58) Field of Classification Search
USPC .......... 322/28; 318/400, 490–499, 770–779; 310/43, 112, 179, 190–199, 680–689
See application file for complete search history.

(56) References Cited

U.S. PATENT DOCUMENTS

| | | | | |
|---|---|---|---|---|
| 1,849,519 A | * | 3/1932 | Gay ........................ | H02P 1/32 310/166 |
| 1,927,208 A | * | 9/1933 | Gay ........................ | H02P 1/46 318/771 |
| 3,035,222 A | * | 5/1962 | Stone ..................... | H02K 19/28 318/770 |
| 3,599,069 A | * | 8/1971 | Welch .................... | H02P 25/08 318/379 |
| 3,784,888 A | * | 1/1974 | Geiersbach ............ | H02P 6/24 318/400.01 |
| 3,931,553 A | * | 1/1976 | Stich ..................... | H02P 6/08 318/400.01 |
| 3,984,750 A | * | 10/1976 | Pfeffer ................... | H02K 19/34 322/32 |

(Continued)

*Primary Examiner* — Pedro J Cuevas
(74) *Attorney, Agent, or Firm* — Michael Best & Friedrich LLP

(57) ABSTRACT

A power source includes a generator configured to receive mechanical energy and convert the mechanical energy to an electrical output. The generator includes a rotor and a stator. The stator has a first coil and a second coil. The first coil and the second coil are selectively arranged in a first configuration to provide the electrical output at a first voltage level and in a second configuration to provide the electrical output at a second voltage level. The power source also includes a detection circuit including a sensing relay. The detection circuit is configured to generate an output based on whether the first coil and the second coil are arranged in the first configuration or in the second configuration.

22 Claims, 8 Drawing Sheets

(56) References Cited

U.S. PATENT DOCUMENTS

| | | | | |
|---|---|---|---|---|
| 4,027,213 A * | 5/1977 | de Valroger | H02P 6/20 318/400.09 |
| 4,035,701 A * | 7/1977 | Jensen | H02P 1/32 318/771 |
| 4,117,388 A * | 9/1978 | Roche | H02K 19/30 322/25 |
| 4,144,470 A * | 3/1979 | Auinger | H02K 17/14 310/198 |
| 4,233,555 A * | 11/1980 | Roche | H02K 19/30 307/16 |
| 4,477,760 A * | 10/1984 | Kuznetsov | H02P 25/20 318/771 |
| 4,489,265 A * | 12/1984 | Kuznetsov | H02P 25/20 318/773 |
| 4,495,451 A * | 1/1985 | Barnard | B60K 6/30 180/165 |
| 4,675,591 A * | 6/1987 | Pleiss | H02P 1/32 310/184 |
| 4,772,842 A * | 9/1988 | Ghosh | H02P 1/32 318/778 |
| 4,947,072 A * | 8/1990 | Watkins | H02P 1/32 310/179 |
| 5,051,639 A * | 9/1991 | Satake | H02K 16/00 310/112 |
| 5,065,305 A * | 11/1991 | Rich | H02K 47/30 318/768 |
| 5,068,559 A * | 11/1991 | Satake | H02K 16/00 310/112 |
| 5,068,587 A * | 11/1991 | Nakamura | H02P 25/18 318/771 |
| 5,352,964 A * | 10/1994 | Nakamura | H02P 25/18 318/771 |
| 5,442,250 A * | 8/1995 | Stridsberg | B60K 7/0007 310/185 |
| 5,449,962 A * | 9/1995 | Shichijyo | H02K 3/28 310/180 |
| 5,483,111 A * | 1/1996 | Kuznetsov | B60L 15/005 104/292 |
| 5,592,393 A | 1/1997 | Yalla | |
| 5,614,799 A * | 3/1997 | Anderson | H02P 1/32 318/400.09 |
| 5,714,821 A * | 2/1998 | Dittman | H02P 9/38 30/180 |
| 5,736,829 A * | 4/1998 | Goff | H02P 6/08 318/496 |
| 5,760,567 A * | 6/1998 | Nakamura | H02P 25/20 310/184 |
| 5,821,660 A * | 10/1998 | Anderson | H02K 3/28 310/184 |
| 5,917,295 A * | 6/1999 | Mongeau | H02P 27/08 318/290 |
| 6,025,693 A * | 2/2000 | Smith | H02P 1/265 318/768 |
| 6,281,609 B1 * | 8/2001 | Itami | G02B 26/121 310/179 |
| 6,331,760 B1 * | 12/2001 | McLane, Jr. | H02K 17/30 310/179 |
| 6,455,974 B1 * | 9/2002 | Fogarty | H02K 3/28 310/184 |
| 6,472,790 B2 * | 10/2002 | Rose, Sr. | H02K 3/28 310/179 |
| 6,479,910 B1 * | 11/2002 | Vithayathil | H02J 3/1828 307/109 |
| 6,570,289 B1 * | 5/2003 | Liang | H02P 9/30 310/179 |
| 6,704,993 B2 * | 3/2004 | Fogarty | H02K 3/28 29/596 |
| 6,727,621 B1 * | 4/2004 | Qu | A47L 9/28 310/113 |
| 6,940,201 B2 * | 9/2005 | Umeda | H02K 3/28 310/179 |
| 6,995,546 B2 * | 2/2006 | Fujikawa | H02K 19/34 310/200 |
| 7,075,206 B1 * | 7/2006 | Chen | H02K 3/28 310/179 |
| 7,227,288 B2 * | 6/2007 | Goche | H02K 3/28 310/184 |
| 7,233,474 B2 | 6/2007 | Brown et al. | |
| 7,348,764 B2 * | 3/2008 | Stewart | H02P 9/48 322/24 |
| 7,528,611 B2 | 5/2009 | Kasztenny et al. | |
| 8,089,252 B2 * | 1/2012 | Lu | H01H 9/26 200/50.32 |
| 8,143,834 B2 * | 3/2012 | Hsu | H02P 1/26 318/247 |
| 8,212,540 B2 * | 7/2012 | Kojima | G05F 1/56 323/273 |
| 8,288,979 B2 * | 10/2012 | Bates | H02P 1/04 310/184 |
| 8,405,382 B2 | 3/2013 | King | |
| 8,405,939 B2 | 3/2013 | Haines et al. | |
| 8,410,876 B2 | 4/2013 | Heckenkamp et al. | |
| 8,446,119 B2 * | 5/2013 | Bates | H02P 27/08 318/494 |
| 8,471,426 B2 * | 6/2013 | Lang | H02K 3/28 310/178 |
| 8,493,012 B2 | 7/2013 | Kellis et al. | |
| 8,547,673 B2 | 10/2013 | Natili et al. | |
| 8,564,167 B2 * | 10/2013 | Fargo | H02K 3/28 310/179 |
| 8,598,836 B1 * | 12/2013 | Rabinovich | H02P 1/28 318/771 |
| 8,803,384 B2 * | 8/2014 | Hull | H02P 9/48 310/179 |
| 8,901,797 B2 * | 12/2014 | Castle | H02K 1/04 310/179 |
| 8,963,463 B2 * | 2/2015 | Bates | H02P 25/18 318/400.41 |
| 8,963,469 B2 * | 2/2015 | Bates | H02P 27/08 318/496 |
| 8,981,695 B2 * | 3/2015 | Bates | H02P 25/18 318/400.41 |
| 8,988,031 B2 * | 3/2015 | Bates | H02P 25/18 318/495 |
| 9,059,658 B2 * | 6/2015 | Bates | H02P 25/18 |
| 9,070,401 B2 * | 6/2015 | Bates | G11B 19/26 |
| 9,287,745 B2 * | 3/2016 | Akatsu | H02K 3/20 |
| 2002/0057030 A1 * | 5/2002 | Fogarty | H02K 3/28 310/196 |
| 2002/0105301 A1 * | 8/2002 | Bush | H02P 25/18 318/771 |
| 2002/0163262 A1 * | 11/2002 | Hsu | H02K 3/28 310/68 R |
| 2005/0200224 A1 * | 9/2005 | Goche | H02K 3/28 310/184 |
| 2008/0012538 A1 * | 1/2008 | Stewart | H02P 9/48 322/89 |
| 2008/0088184 A1 * | 4/2008 | Tung | H02J 1/08 307/80 |
| 2009/0072801 A1 * | 3/2009 | Kojima | G05F 1/56 323/273 |
| 2010/0052584 A1 * | 3/2010 | Bates | H02P 27/08 318/400.11 |
| 2010/0181949 A1 * | 7/2010 | Bates | H02P 3/12 318/400.09 |
| 2011/0205662 A1 * | 8/2011 | Bates | H02P 27/08 360/73.08 |
| 2011/0234139 A1 * | 9/2011 | Hsu | H02P 1/26 318/497 |
| 2012/0286593 A1 * | 11/2012 | Yokogawa | H02K 1/278 310/43 |
| 2012/0293024 A1 * | 11/2012 | Yokogawa | H02K 1/278 310/43 |
| 2013/0175966 A1 * | 7/2013 | Astigarraga | H02P 6/08 318/497 |
| 2013/0229136 A1 * | 9/2013 | Bates | H02P 25/18 318/400.41 |

(56) References Cited

U.S. PATENT DOCUMENTS

| | | | |
|---|---|---|---|
| 2015/0028713 A1* | 1/2015 | Rahman | H02K 3/28 310/198 |
| 2015/0035395 A1* | 2/2015 | Trainer | H02K 1/16 310/71 |
| 2016/0164361 A1* | 6/2016 | Fukuyanagi | H02K 11/33 310/68 D |
| 2016/0181883 A1* | 6/2016 | Yamasaki | H02K 11/33 310/68 D |

* cited by examiner

| Power Output Setting | Over-Voltage Limit (Volts) | Over-Current Limit (Amps) | 1st Sensing Relay Detection Voltage (VAC) | 2nd Sensing Relay Detection Voltage (VAC) | Switch Position | 1st Detection Output | 2nd Detection Output |
|---|---|---|---|---|---|---|---|
| 120/240V 1φ | 264 | 394 | 0 | 0 | Off | OPEN | OPEN |
| 208/240V 3φ | 264 | 444 | 120 | 0 | Off | GROUND | OPEN |
| 480V 3φ | 528 | 202 | 120 | 277 | Off | GROUND | GROUND |
| 600V 3φ | 660 | 160 | 120 | 300 | On | OPEN | GROUND |

*FIG. 6*

PROTECTION METHOD FOR A GENERATOR

BACKGROUND

The present invention relates to portable power systems that include a generator. In particular, the present invention is related to multi-voltage power generators.

SUMMARY

Generators have typically been used to provide electrical power in areas where receiving electrical power from an electrical grid is not feasible. Sometimes the generator provides different types of electrical power (e.g., AC and DC) at various voltage levels (e.g., 12V, 120V, 600V) to supply energy necessary to run particular systems. These generators are often equipped with a protection device (e.g., a circuit breaker) that allows the operation of the generator to stop when the power output exceeds particular electrical parameters. However, the electrical parameters are often different based on what type and what level of electrical power is being provided by the generator.

In the past, only two protection ranges have been provided for generators capable of providing three or more different levels of output power. The third level would be protected by the thermal characteristics of the circuit breaker, which was often sized for three-phase operation. In such cases, protection for single-phase power output was difficult to provide because the limits for such operation were sometimes lower than even the thermal characteristics of the circuit breaker.

In other applications, auxiliary contacts were used in conjunction with a voltage selector switch. The auxiliary contacts detect the position of the voltage selector switch and determine appropriate protection electrical parameters. The auxiliary contacts, however, create design issues in terms of packaging and physically including them in conjunction with the voltage selector switch. In addition, the auxiliary contacts restrict the voltage selector switch to a rotary switch so that the auxiliary contacts can determine the position of the voltage selector switch.

In other embodiments, several protection relays have been employed to provide different protection electrical parameters for each power output setting (e.g., each level of the electrical output) of the generator. In such embodiments, at least one protection relay is used to monitor each power output setting of the generator. Therefore, on a multi-voltage generator, adding several protection relays increases the cost of the generator.

In contrast and as described below, the present application describes a power source that includes a generator capable of providing different levels of the electrical output from the generator (e.g., different voltage levels of the electrical output). A protection device is used to protect the generator at the different power output settings. The power source includes a straight-forward detection circuit that automatically determines the power output setting for the generator. The output of the detection circuit is then used to determine appropriate protection parameters for the specific power output setting. The protection device then halts operation of the power source if the electrical output exceeds the appropriate protection parameters.

In one embodiment, the invention provides a power source that includes a generator configured to receive mechanical energy and convert the mechanical energy to an electrical output. The generator includes a rotor and a stator. The stator has a first coil and a second coil. The first coil and the second coil are selectively arranged in a first configuration to provide the electrical output at a first level and in a second configuration to provide the electrical output at a second level. The generator also includes a detection circuit including a sensing relay. The detection circuit is configured to generate an output based on whether the first coil and the second coil are arranged in the first configuration or in the second configuration.

In another embodiment the invention provides a method of operating a power source. The method includes receiving, at a generator, mechanical energy and converting, by the generator, mechanical energy to an electrical output. The method also includes selectively arranging a first coil and a second coil in one of the group including at least a first configuration and a second configuration. The method further includes providing, by the generator, the electrical output at a first level when the first coil and the second coil are arranged in the first configuration, providing, by the generator, the electrical output at a second level when the first coil and the second coil are arranged in the second configuration, and generating, by a detection circuit, an output based on whether the first coil and the second coil are arranged in the first configuration or in the second configuration. The detection circuit includes a sensing relay.

Other aspects of the invention will become apparent by consideration of the detailed description and accompanying drawings.

BRIEF DESCRIPTION OF THE DRAWINGS

FIG. 6 is a table that illustrates the relationship between the coil configurations, protection limits, and detection outputs.

DETAILED DESCRIPTION

Figure 1:
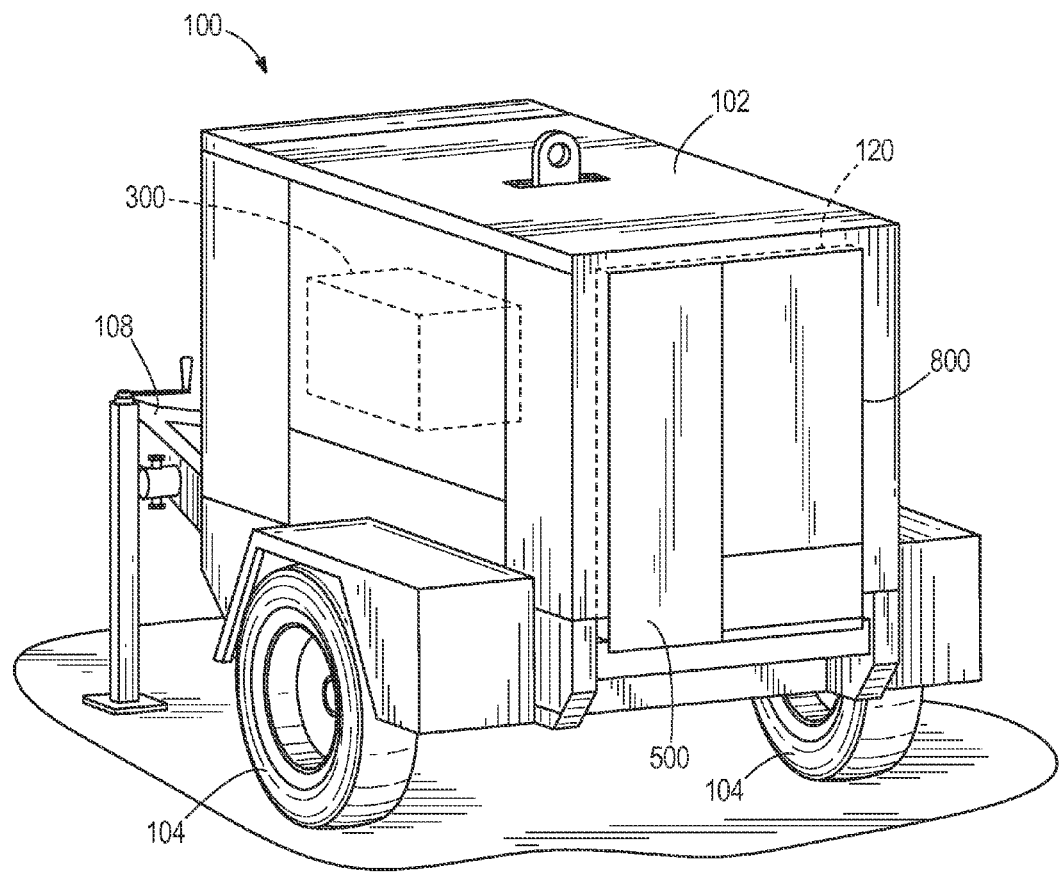
FIG. 1 illustrates a power source according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a mobile power source 100. The mobile power source 100 is typically used at locations where electrical power from the power grid is not available. To improve the versatility of the generator 100 and allow the power source 100 to be used for different applications (i.e., to power components and/or equipment with various power requirements), the power source 100 is configured to provide different types and/or levels of electrical outputs. The power source 100 also includes a detection circuit that automatically (e.g., without human interaction) detects the electrical output level. A protection device of the power source 100 then protects the power source 100 based on protection parameters determined from the output from the detection circuit. Therefore, the power source 100 is able to properly adjust protection parameters for each power output setting such that the hardware of the power source 100 remains uncompromised.

FIG. 1 shows an exemplary mobile power source 100 that has a housing 102. The mobile power source 100 can be implemented as, for example, a mobile or portable generator, construction or rental generator, mobile light tower, and onboard power generator. Although the mobile power source 100 is shown to be mobile on a pair of wheels 104 and equipped with a trailer hitch 108, the mobile power source 100 may not have wheels, or may have additional wheels. The mobile power source 100 has a generator 300 mounted in the housing 102 to generate electrical power. In some embodiments, the generator 300 can have a power rating between about 20 KVA to about 625 KVA with larger or smaller power ratings being possible. The mobile power source 100 has a control panel 500 positioned adjacent to an output panel 800. The control panel 500 and output panel 800 are mounted in an enclosure 120 positioned in the housing 102. Although FIG. 1 shows that the control panel 500 is positioned adjacent to the output panel 800, the control panel 500 can be spaced apart from the output panel 800.

Figure 2:
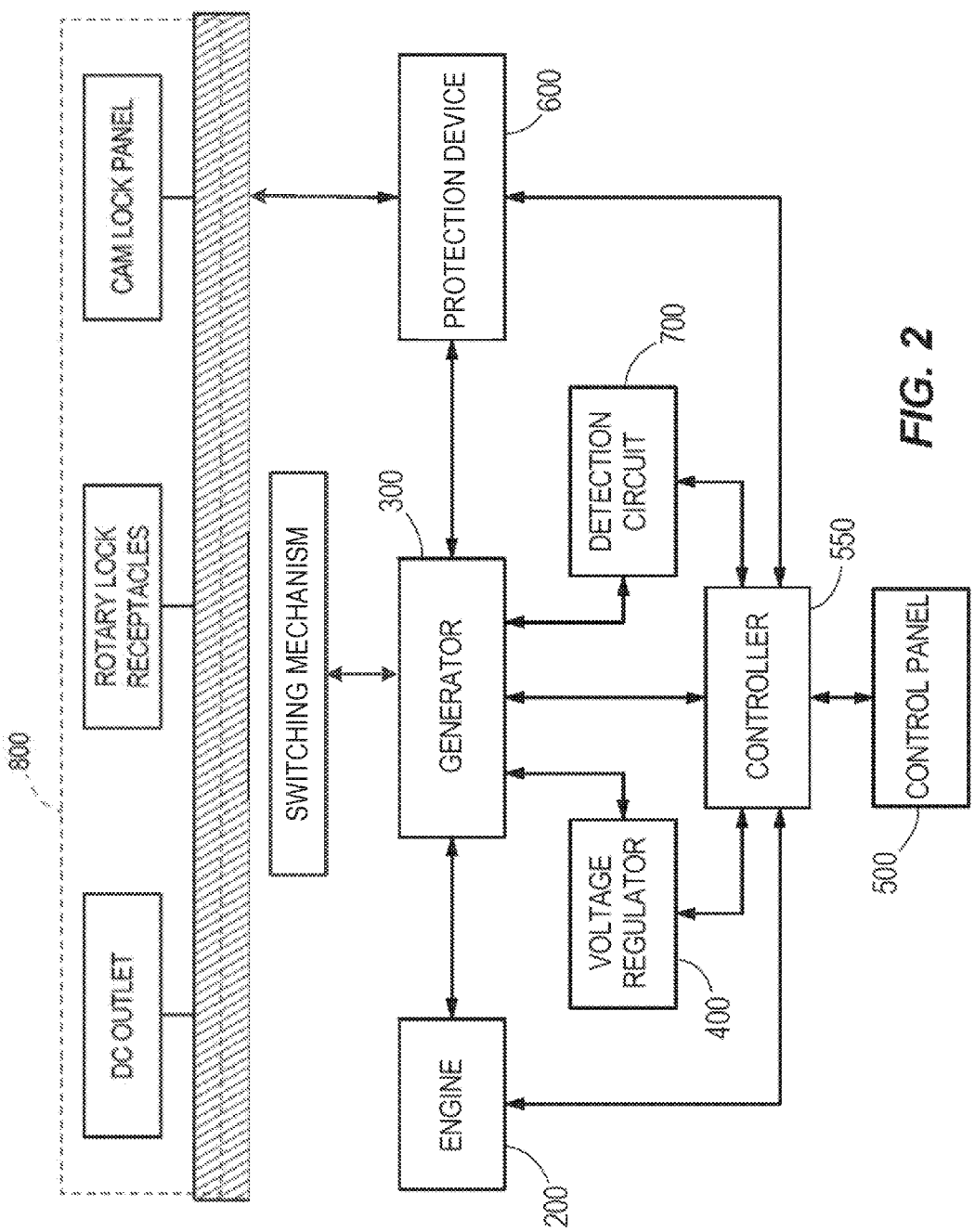
FIG. 2 is a schematic diagram of the power source of FIG. 1.

As shown in FIG. 2, the power source 100 includes an engine 200, a generator 300, a voltage regulator 400, a control panel 500, a controller 550, a protection device 600, a detection circuit 700, and an output panel 800. The engine 200 is coupled to a fuel source, an exhaust system, and the generator 300. The engine 200 includes various mechanical components (e.g., pistons, cylinders, crankshaft, etc.) that allow the engine 200 to convert fuel energy to mechanical energy. The engine 200 receives fuel energy from the fuel source or fuel storage (e.g., fuel tank). In the illustrated embodiment, the engine 200 uses diesel fuel to generate mechanical energy. In other embodiments, however, the engine 200 may utilize different types of fuel such as, for example, gasoline, vegetable oil, butane gas, propane gas, natural gas, and the like. As combustion occurs in the cylinders of the engine 200, the crankshaft moves in response to the movement of the pistons, and the engine 200 generates mechanical energy. Any exhaust gases or excess air is then expelled through the exhaust system. In some embodiments, the power source 100 includes an exhaust processing system that treats the exhaust gas from the engine 200 before releasing the exhaust material to the atmosphere. The housing 102 includes openings that allow the exhaust material to be released to the atmosphere. While the engine has been described as a reciprocating piston engine, other types of prime movers are also well-suited to powering the generator 300 as described herein.

Figure 3:
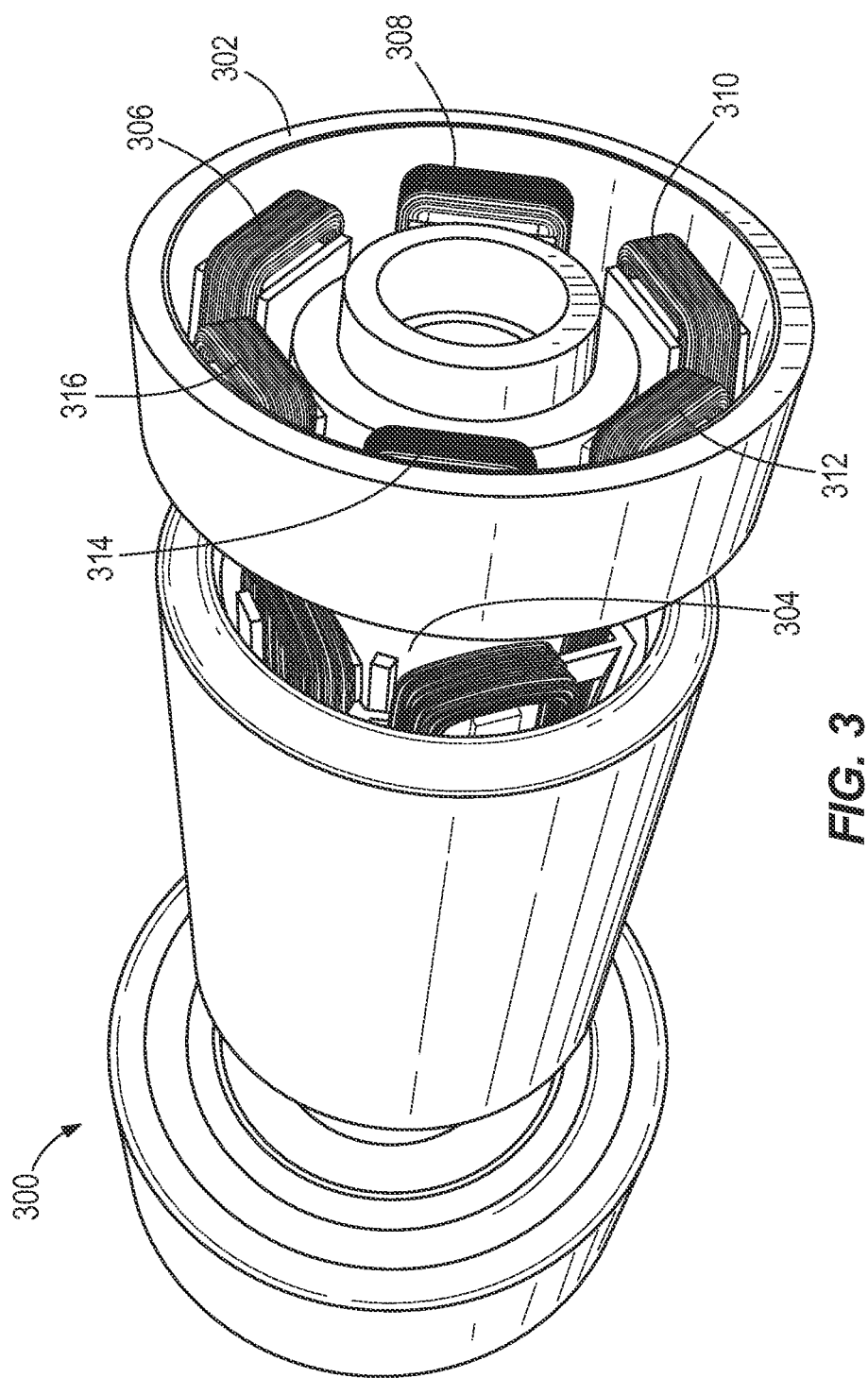
FIG. 3 illustrates a broken away view of a generator of the power source shown in FIG. 1.

The generator 300 is coupled to the engine 200 and to the protection device 600. The generator receives mechanical energy from the engine 200 through the crankshaft and converts the mechanical energy to an electrical output through magnetic induction. As shown in FIG. 3, the generator 300 includes a stator 302 and a rotor 304. The rotor 304 is coupled to the crankshaft of the engine 200 and rotates with the rotation of the crankshaft. The rotor 304 includes a plurality of conductive coils wound around an iron core. The stator 302 also includes a plurality of conductive coils 306, 308, 310, 312, 314, 316 wound onto the outer casing of the generator 300. In the illustrated embodiment, the conductive coils are made out of copper. However, in other embodiments, any other conductive material may be used for the conductive coils. As current passes through the conductive coils of the rotor 304, the coils of the rotor 304 create an electromagnetic field. As the rotor 304 rotates (due to the rotation of the crankshaft) the electromagnetic field cuts across the plurality of coils 306, 308, 310, 312, 314, 316 of the stator 302 and generates a current on the stator coils 306, 308, 310, 312, 314, 316 thereby providing the electrical output.

The stator coils 306, 308, 310, 312, 314, 316 can be connected in different configurations to allow the generator 300 to provide power outputs at different voltage levels. In the illustrated embodiment, the stator 302 includes six wound coils 306, 308, 310, 312, 314, 316 to provide a three-phase power output. Each power phase combines two stator coils 306, 308, 310, 312, 314, 316 in either series or parallel. In the illustrated embodiment, the six stator coils 306, 308, 310, 312, 314, 316 can be selectively arranged in a first configuration 320 (FIG. 4A) to provide single-phase power, a second configuration 322 (FIG. 4B) to provide three-phase low-voltage power, and a third configuration 324 (FIG. 4C) to provide two different three-phase high-voltage power outputs. Therefore, by changing the connections between the stator coils 306, 308, 310, 312, 314, 316 between three different configurations 322, 324, 326, the generator 300 provides the electrical output at four different voltage levels.

In other embodiments, the number of stator coils may be more or less than six. In other embodiments, the number of configurations may also vary. For example, the stator coils 306, 308, 310, 312, 314, 316 may only be arranged in a first configuration or a second configuration, but not a third configuration. In yet other embodiments, the stator coils 306, 308, 310, 312, 314, 316 may be arranged in a first configuration, a second configuration, a third configuration, and a fourth configuration. In other embodiments, the voltage levels corresponding to each configuration may also be different.

Figure 4A:
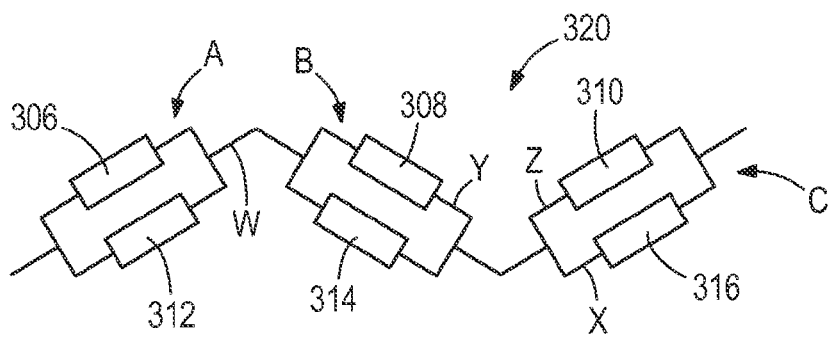
FIG. 4A illustrates a first configuration for arranging stator coils of the generator.

As shown in FIG. 4A, in the first configuration 320 (e.g., single-phase configuration), the stator coils 306, 308, 310, 312, 314, 316 are arranged in three pairs A, B, C. Pair A includes a first coil 306 and a fourth coil 312, pair B includes a second coil 308 and a fifth coil 314, and pair C includes a third coil 310 and a sixth coil 316. Within each pair, the coils 306, 308, 310, 312, 314, 316 are connected in parallel to each other. For example, as shown in FIG. 4A, the first coil 308 is connected in parallel to the fourth coil 312, the second coil 310 is connected in parallel to the fifth coil 314, and the third coil 310 is connected in parallel with the sixth coil 316. Each pair A, B, C is connected in series to the next pair, as also shown in FIG. 4A. In the illustrated embodiment, the first configuration 320 provides single phase power at 120V. In some embodiments, the first coil 306 is connected in series directly with the second coil 308 and the fourth coil 312 and the fifth coil 314 are also connected in series, while the first coil 306 and the second coil 308 are connected in parallel with the fourth coil 312 and the fifth coil 314. Such alternative connection is equivalent to the connection shown in FIG. 4A and therefore, also provides single phase power at 120V.

Figure 4B:
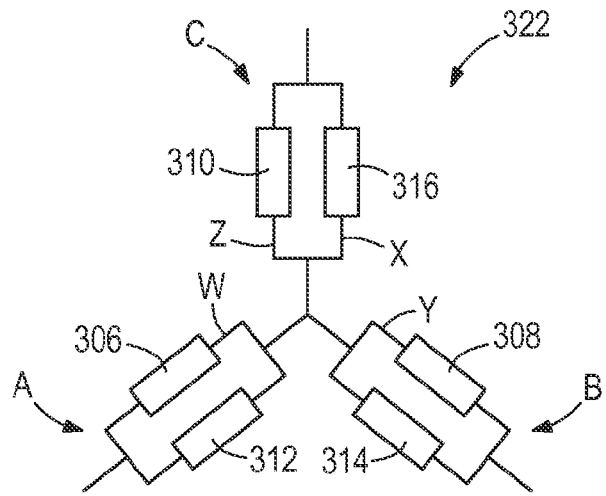
FIG. 4B illustrates a second configuration for arranging stator coils of the generator.

As shown in FIG. 4B, in the second configuration 322, the stator coils 306, 308, 310, 312, 314, 316 are still arranged in three pairs A, B, C. In the second configuration 322, the stator coils 306, 308, 310, 312, 314, 316 in each pair A, B, C are connected in parallel to each other. For example, the first coil 306 is connected in parallel with the fourth coil 312, and so on. In contrast to the first configuration 320, in the second configuration 322, the three pairs A, B, C are connected together in a wye configuration. The wye configuration allows the generator 300 to provide a three-phase power output. Because the stator coils 306, 308, 310, 312, 314, 316 in each pair are connected in parallel with each other, the second configuration 322 is sometimes considered a low power configuration. In the illustrated embodiment, the second configuration 322 provides three-phase power at 240V.

Figure 4C:
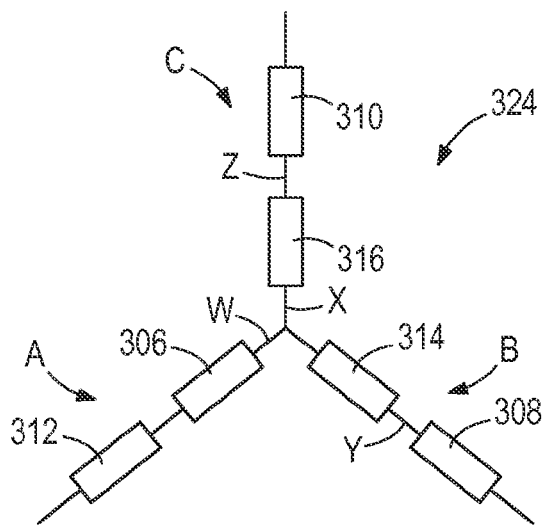
FIG. 4C illustrates a third configuration for arranging stator coils of the generator.

As shown in FIG. 4C, in the third configuration 324, the stator coils 306, 308, 310, 312, 314, 316 are also arranged in a wye configuration. In the third configuration 324, however, the stator coils 306, 308, 310, 312, 314, 316 in each pair A, B, C are connected in series to each other rather than in parallel. As shown in FIG. 4C, the first coil 306 is connected in series with the fourth coil 312, in the second pair B the second coil 308 is connected in series with the fifth coil 314, and in the third pair C the third coil 310 is connected in series with the sixth coil 316. The pairs A, B, C are then connected together at one end to form the wye configuration. Connecting each of the stator coils 306, 308, 310, 312, 314, 316 in series allows the generator 300 to provide power at a higher voltage level than the second configuration 322. Therefore, the third configuration 324 is sometimes referred to as a high power configuration. The third configuration 324 provides three-phase power at either 480V or 600V.

In general, the generator 300 outputs an alternating current due to the oscillation of the electromagnetic field in the generator 300. The peaks of the output alternating current increases with a stronger electromagnetic field. Analogously, as the strength of the electromagnetic field decreases, the peaks of the output alternating current decrease. The voltage regulator 400 conditions the alternating power from the generator 300 to provide an electrical output with a consistent voltage level. The voltage regulator 400 is coupled to and adjusts the generator 300. The voltage regulator 400 adjusts the electromagnetic field of the generator 300 to provide a power output with constant voltage. The voltage regulator 400 may adjust the electromagnetic field by, for example, adjusting a control voltage of the generator 300. The voltage regulator 400 changes the electromagnetic field of the generator 300 in response to the load experienced by the generator 300. Therefore the generator 300 provides a power output with a constant voltage level even when the load fluctuates. For example, during high demand, the voltage level of the electrical output from the generator 300 may decrease. In such situations, the voltage regulator 400 increases the strength of the electromagnetic field of the generator 300 so the generator 300 compensates for the high load. Analogously, when demand is low, the voltage level of the electrical output from the generator 300 may increase. In such situations, the voltage regulator 400 decreases the strength of the electromagnetic field of the generator 300 so the generator 300 compensates for the low load.

Figure 5:
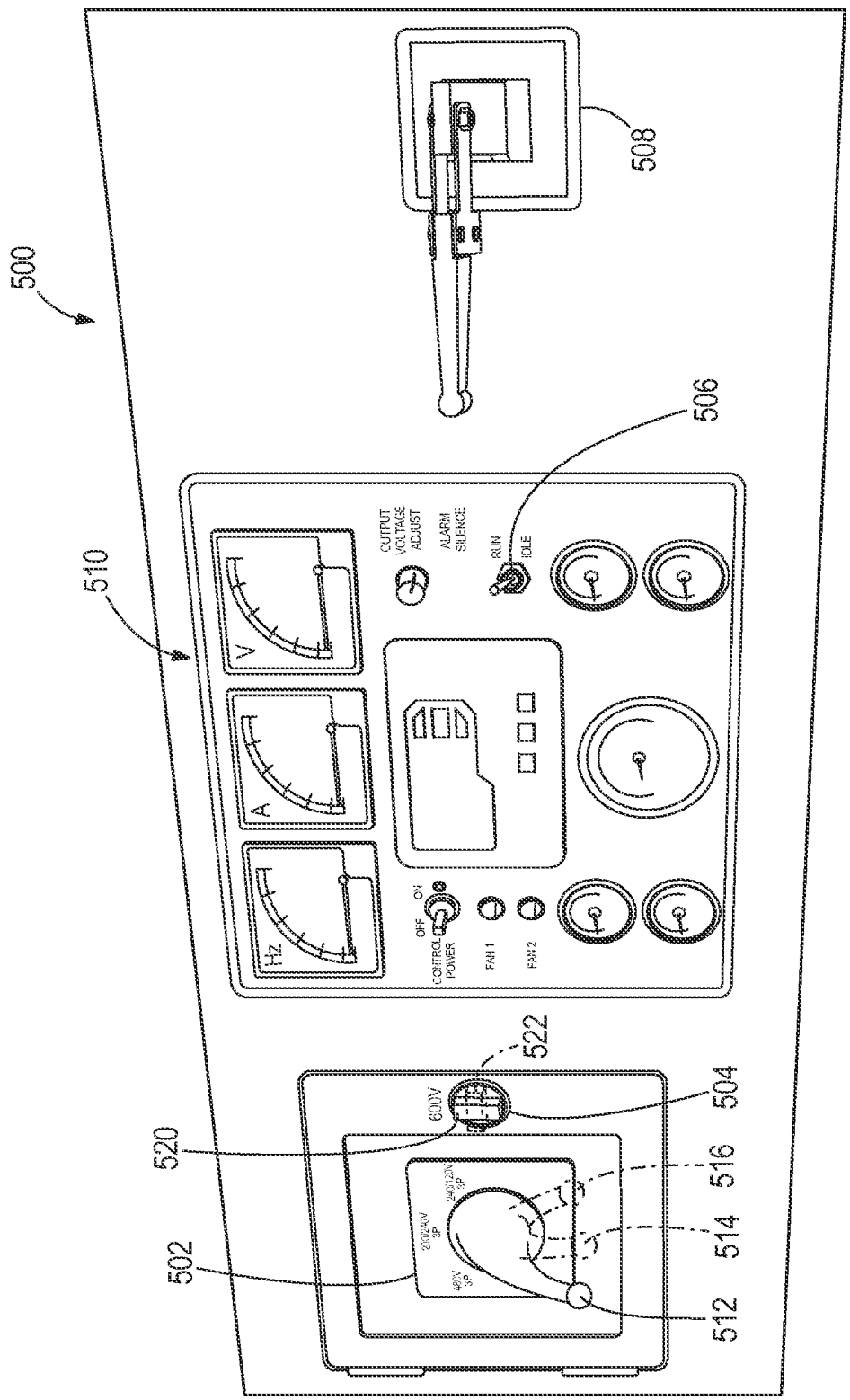
FIG. 5 illustrates an exemplary control panel of the power source of FIG. 1.

As shown in FIG. 2, the power source 100 also includes the control panel 500. The control panel 500 provides input and output elements for an operator of the power source 100 to control and monitor operation of the power source 100. As shown in FIG. 5, the control panel includes a voltage selector control 502, a 600V switch 504, a Run/Idle switch 506, an On/Off actuator 508, and a measurement interface 510. The voltage selector control 502 controls the voltage level of the power output from the generator 300 by allowing the operator to determine in which configuration the stator coils 306, 308, 310, 312, 314, 316 are arranged. In the illustrated embodiment, the voltage selector control 502 is movable between three positions 512, 514, 516 (shown in phantom in FIG. 5). When the voltage selector control 502 is in the first position 512, the generator 300 arranges the stator coils 306, 308, 310, 312, 314, 316 in the first configuration 320 to provide single-phase power. When the voltage selector control 502 is in the second position 514 and in the third position 516, the stator coils 306, 308, 310, 312, 314, 316 are arranged in the second configuration 322 and the third configuration 324, respectively. The voltage selector control 502 is coupled to a mechanism that changes the connections between the stator coils 306, 308, 310, 312, 314, 316. In some embodiments, the mechanism includes a series of switches that change the connections between the coils.

The 600V switch 504 is coupled to the voltage selector control 502 and to the controller 550. The 600V switch 504 determines when the third configuration 324 provides power at 600V instead of power at 480V. The 600V switch 504 is movable between a first position 520 and a second position 522. In the first position 520, the 600V switch 504 is deactivated and the generator 300 provides 480V output when the voltage selector control 502 is in the third position 516. In the second position 522, the 600V switch 504 is activated and the generator 300 provides 600V output when the voltage selector control 502 is in the third position 516. When the voltage selector control 502 is not in the third position 516, the position of the 600V switch 504 is not considered when determining the power output. The 600V switch 504 is coupled to the controller 550 such that the controller 550 alters the reference voltage used by the voltage regulator 400 when the stator coils 306, 308, 310, 312, 314, 316 are arranged in the third configuration 324. By altering the reference voltage of the voltage regulator 400, the voltage regulator 400 allows the generator 300 to produce power at 600V power rather than at 480V. In some embodiments, the 600V switch 504 may be coupled directly to the voltage regulator 400 to alter the reference voltage of the voltage regulator 400. In such embodiments, the 600V switch 504 may not be coupled to the controller 550.

The Run/Idle switch 506 allows the operator to determine when the power source 100 should generate a power output and alternatively, when the generator 300 does not need to run. In the illustrated embodiment, when the power source 100 is in idle operation, the engine 200 may still convert fuel energy into mechanical energy, but the generator 300 may be disconnected from the engine 200 and therefore not produce any electrical power. When the Run/Idle switch 506 is in the Run position, the generator 300 is connected to the engine 200 and electrical power is produced. The On/Off actuator 508 serves as a breaker module to disconnect the output power from the AC outlets on the output panel 800. The measurement interface 510 includes analog and/or digital interfaces that allow the user to monitor the operation of the power source 100 by displaying different parameters of the operation. For example, the measurement interface 510 may include a display of the revolutions per minute of the engine, output voltage, output current, output frequency, a fuel gauge, a temperature gauge, an oil pressure or temperature gauge, etc. In some embodiments, the power source 100 also includes a battery to help start the engine, and the control panel 500 may also include a battery voltage gauge. In the illustrated embodiment, the control panel 500 includes all of the above. In other embodiments, the control panel 500 may include more or less measurement gauges or interfaces. The measurement gauges or interfaces may also be different based on which parameters are monitored by the power source 100. The control panel 500 may also include control actuators to control other elements of the power source 100. For example, the control panel 500 may include a fan control that determines when and at what speed an internal fan operates to release exhaust gas to the atmosphere. Other controls can also be incorporated into the control panel as may be desired.

The elements of the control panel 500 are coupled to the controller 550 shown in FIG. 2. The controller 550 receives inputs and signals from the actuators of the control panel 500 and outputs control signals or information signals to the other components of the power source 100. The controller 550 may also receive signals from various sensors within the power source 100 and determine when and if to issue alarms or adjust operation of the power source 100. For example, the controller 550 may provide control signals from the voltage selection control 502 to the mechanism which physically changes the connections between the stator coils 306, 308, 310, 312, 314, 316. The controller 550, as shown in FIG. 2, provides control and/or information signals to the engine 200 (e.g., to control fuel injectors), the generator 300 (e.g., to monitor operation), the protection device 600 (e.g., to halt operation of the power source 100), and the detection circuit 700 (e.g., to determine the configuration of the stator coils 306, 308, 310, 312, 314, 316). In some embodiments, the controller 550 also communications with the voltage regulator 400 (e.g., to change the reference voltage according to the 600V switch 504). The controller 550 can also receive information from each of the components listed above.

Once the operator uses the voltage selection control 502 and possibly the 600V switch 504 to determine the power output from the generator 300, the generator 300 provides the desired power output. Before the power output is directed to the output panel 800, the power is transferred to the protection device 600. The protection device 600 is coupled to the generator 300, the controller 550, and the output panel 800. The protection device 600 includes a circuit breaker. In the illustrated embodiment, the controller 550 determines whether the electrical output from the generator 300 is within an acceptable power output range by comparing the actual power output to specific protection parameters. If the actual power output from the generator 300 exceeds any of the protection parameters, the controller 550 sends a signal for the protection device 600 to halt operation of the power source 100 to protect the power source 100 and the connected equipment from potential damage. In the illustrated embodiment, the protection device 600 disconnects the generator 300 from the load (e.g., the connected equipment) to inhibit the generator 300 from providing power. The protection device 600 and/or the controller 550 may, additionally or alternatively, shut off the engine 200, the generator 300, or both to inhibit the generator 300 from producing the electrical output.

The protection parameters vary according to the power output setting (e.g., the voltage level of the power output) selected by the operator using the voltage selection control 502 and the 600V switch 504. For example, if the operator selects the three-phase 600V power output, some of the protection parameters may be higher than when the operator selects the single-phase 120V power output. Therefore, the controller 550 communicates with the protection device 600 regarding the current power output setting of the generator 300. In some embodiments, the controller 550 sends a control signal to the protection device 600 when the actual power output exceeds the protection parameters. In other embodiments, the protection device 600 has a more active role and may determine the appropriate protection parameters and whether the actual power output exceeds the protection parameters.

In the illustrated embodiment, the protection parameters include an over-voltage limit and an over-current limit. In the illustrated embodiment, the protection parameters are unique to each power output setting. In other embodiments, some of the power output settings may share the same protection parameters. FIG. 6 illustrates the protection parameters used for each power output setting (e.g., for particular power rating) in the illustrated embodiment. When the power source 100 outputs single-phase power at 120V, the controller 550 considers an over-voltage limit of 264V and an over-current limit of 394 A. When the power source 100 outputs three-phase power at 240V, the controller 550 considers an over-voltage limit of 264V and an over-current limit of 444 A. The over-voltage limit for when the power source 100 outputs three-phase power at 480V is 528V, while the over-current limit for the same power output is 202 A. Finally, when the power source 100 outputs three-phase power at 600V, the controller 550 considers an over-voltage limit of 660V and an over-current limit of 160 A.

As shown by the table of FIG. 6, the over-voltage and over-current limits vary based on the power output setting. Therefore, the protection device 600 and/or the controller 550 halts the power source 100 based on the protection parameters specific to each power output setting. It should be understood that the values shown in the table of FIG. 6 and discussed above are exemplary and other limits are within the scope of the invention. For example, the over-voltage and over-current limits set forth above may be changed to different values based on, for example, experimental data.

To ensure that the appropriate protection parameters are used in each power output setting, the power source 100 includes the detection circuit 700. The detection circuit 700 is coupled to at least some of the stator coils 306, 308, 310, 312, 314, 316, and to the controller 550. The detection circuit 700 analyzes the voltages at the connections with the stator coils 306, 308, 310, 312, 314, 316 to determine how the stator coils 306, 308, 310, 312, 314, 316 are arranged (i.e., in what configuration the stator coils 306, 308, 310, 312, 314, 316 are arranged). The detection circuit 700 also analyzes the state (i.e., the position) of a switch to determine if the third configuration 324 is configured to provide power at 480 V or at 600V power. The detection circuit 700 generates two detection outputs 750, 754 to indicate the power output setting for the generator 300.

In the illustrated embodiment, the controller 550 receives the two detection outputs 750, 754 and determines what the power output setting is for the power source 100. The controller 550 then determines which protection parameters to consider when monitoring the actual power output from the power source 100. In other words, the controller 550 receives the two detection outputs 750, 754, determines the power output setting for the power source 100, determines the appropriate protection parameters, and compares the actual power output to the appropriate protection parameters. The controller 550 then sends a control signal to the protection device 600 to deactivate the power source 100 if the actual power output exceeds any of the protection parameters.

Figure 7:
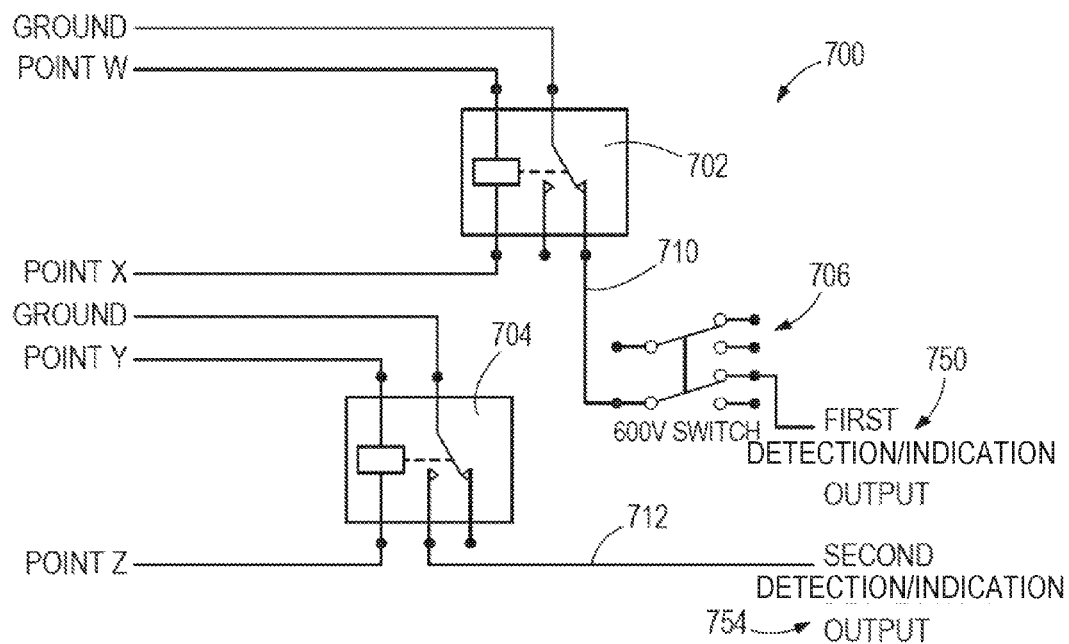
FIG. 7 illustrates a schematic diagram of a detection circuit of the power source shown in FIG. 1.

As shown in FIG. 7, the detection circuit 700 includes a first sensing relay 702, a second sensing relay 704, and a switch 706. The first sensing relay 702, the second sensing relay 704, and the switch 706 generate the two detection outputs 750, 754. In the illustrated embodiment, the sensing relays 702, 704 operate with an active-low logic. In other embodiments, the sensing relays 702, 704 may operate with an active-high logic, and the operation of the detection circuit 700 is adjusted accordingly (e.g., the truth table associated with the different power output configurations). The first sensing relay 702 is coupled to one end of the first pair A of the stator coils 306, 312 at point W (FIGS. 4A-C) and to a first end of the sixth stator coil 316 at point X (FIGS. 4A-C). The first sensing relay 702 is configured to detect when the voltage between point W and point X changes to 120V. When the first sensing relay 702 detects that the voltage between point W and point X is 120V, the first sensing relay 702 generates a first output signal 710 that is connected to ground. When the first sensing relay 702 detects that the voltage between point W and point X is not 120V, the first output signal 710 is an open circuit. The first output signal 710 is connected to the switch 706. The position of the switch 706 indicates whether the generator 300 is configured to provide power at 480V or at 600V. In the illustrated embodiment, the switch 706 corresponds to the 600V switch 504. In other embodiments, however, the switch 706 may be coupled to the 600V switch 504 and reflect the position of the 600V switch 504, or the switch 706 may be separate from the 600V switch 504. When the switch 706 is not activated (e.g., the 600V switch 504 is in the first position 520), the first detection output 750 is the same as the first output signal 710. However, when the switch 706 is activated (i.e., the 600V switch 504 is in the second position 522), the switch 706 changes (e.g., modifies) the first output signal 710 and the first detection output 750 is different than the first output signal 710.

The second sensing relay 704 is coupled to one end of the second pair B of stator coils 308, 314 at point Y and to an end of the third stator coil 310 that is connected between the third stator coil 310 and the sixth stator coil 316 at point Z. The second sensing relay 704 is configured to detect when the voltage between point Y and point Z changes between 0V, 277V, and 300V. When the second sensing relay 704 detects that the voltage between point Y and point Z is 0V, the second sensing relay 704 generates a second output signal 712 that indicates an open circuit. However, when the second sensing relay 704 detects that the voltage between point Y and point Z is 277V or 300V, the second output signal 712 is grounded. The second output signal 712 is directly connected to the second detection output 754. Therefore, the second detection output 754 corresponds to the second output signal 712.

Referring back to FIG. 6, the table indicates which power output settings correspond to the different detection outputs 750, 754. Because each of the sensing relays 702, 704 can generate either a grounded output signal or an open output signal, between the two sensing relays 702, 704 a total of four different power output settings can be determined. The table of FIG. 6 illustrates that when the power output is set to provide single phase power (i.e., the stator coils 306, 308, 310, 312, 314, 316 are in the first configuration 320), the first sensing relay 702 detects a voltage of 0V and therefore generates an open first output signal 710. Since the switch 706 is deactivated because 600V are not being provided, the first detection output 750 corresponds to the first output signal 710. While in the same configuration (i.e., in the first configuration 320), the second sensing relay 704 also detects a voltage of 0V and also generates an open second output signal 712. When both the first detection output 750 and the second detection output 754 are open, the controller 550 determines that the stator coils 306, 308, 310, 312, 314, 316 are arranged in the first configuration 320 to provide single-phase power at 120V.

When the power output is set to provide three-phase power at 240V (i.e., the stator coils 306, 308, 310, 312, 314, 316 are arranged in the second configuration 322), the first sensing relay 702 detects a voltage of 120V and therefore generates a grounded first output signal 710. Since the switch 706 is deactivated (i.e., in the first position) because 600V are not being provided, the first detection output 750 corresponds to the first output signal 710. While in the same power output setting, the second sensing relay 704 detects a voltage of 0V and still generates an open second output signal 712 that corresponds to the second detection output 754. As shown in the table of FIG. 6, when the first detection output 750 is grounded and the second detection output 754 is open, the controller 550 determines that the stator coils 306, 308, 310, 312, 314, 316 are arranged in the second configuration 322 to provide three-phase power at 240V.

When the power output is set to provide three-phase power at 480V (i.e., that stator coils 306, 308, 310, 312, 314, 316 are arranged in the third configuration), the first sensing relay 702 detects a voltage of 120V and therefore generates a grounded first output signal 710. Since the switch 706 is deactivated because 600V are not being provided, the first detection output 750 corresponds to the first output signal 710. While in the same power output setting, the second sensing relay 704 detects a voltage of 277V and generates a grounded second output signal 712 that corresponds to the second detection output 754. As shown in the table of FIG. 6, when the first detection output 750 and the second detection output 754 are grounded, the controller 550 determines that the stator coils 306, 308, 310, 312, 314, 316 are arranged in the third configuration 324 and the voltage regulator 400 is configured such that the generator 300 produces three-phase power at 480V.

When the power output is set to provide three-phase power at 600V (i.e., the stator coils 306, 308, 310, 312, 314, 316 are arranged in the third configuration), the first sensing relay 702 detects a voltage of 120V and therefore generates a grounded first output signal 710. Since the power output is set to provide power at 600V, the switch 706 is activated. Since the switch 706 is activated, the first detection output 750 does not correspond to the first output signal 710. Instead, the first detection output 750 is an open signal, while the first output signal 710 is grounded. While in the same power output setting, the second sensing relay 704 detects a voltage of 300V and generates a grounded second output signal 712 that corresponds to the second detection output 754. As shown in the table of FIG. 6, when the first detection output is an open signal and the second detection output 754 is grounded, the controller 550 determines that the stator coils 306, 308, 310, 312, 314, 316 are arranged in the third configuration 324 and the voltage regulator 400 is configured such that the generator 300 produces three-phase power at 600V.

The sensing relays 702, 704 detect different voltages based on the configuration 320, 322, 324 in which the stator coils 306, 308, 310, 312, 314, 316 are arranged. Note that the sensing relays 702, 704 can be coupled to at least some of the stator coils 306, 308, 310, 312, 314, 316 at different points than the ones described above. In such embodiments, the table of FIG. 6 may also be altered such that the different detection outputs 750, 754 correspond to the different power output settings. It should also be understood that while three different configurations were described above, other configurations may alternatively or additionally be used to generate power outputs at different or the same output voltage levels.

When the power source 100 is first turned on, some time passes before the stator coils 306, 308, 310, 312, 314, 316 are fully and evenly energized. Therefore, before generating the first output signal 710 and the second output signal 712, the detection circuit 700 waits a predetermined period of time. In fact, the detection circuit 700 waits to receive an indication that the engine 200 is operating properly by waiting until the revolutions per minute of the engine 200 surpass a predetermined threshold, for example 650 revolutions per minute. Once the engine revolutions meet or exceed the predetermined threshold, the controller 550 starts a timer to wait the predetermined period of time. If the idle switch is activated while the timer is running, the timer is reset and the controller 550 does not receive the first and second detection outputs 750, 754 until the predetermined period of time has elapsed.

Figure 8:
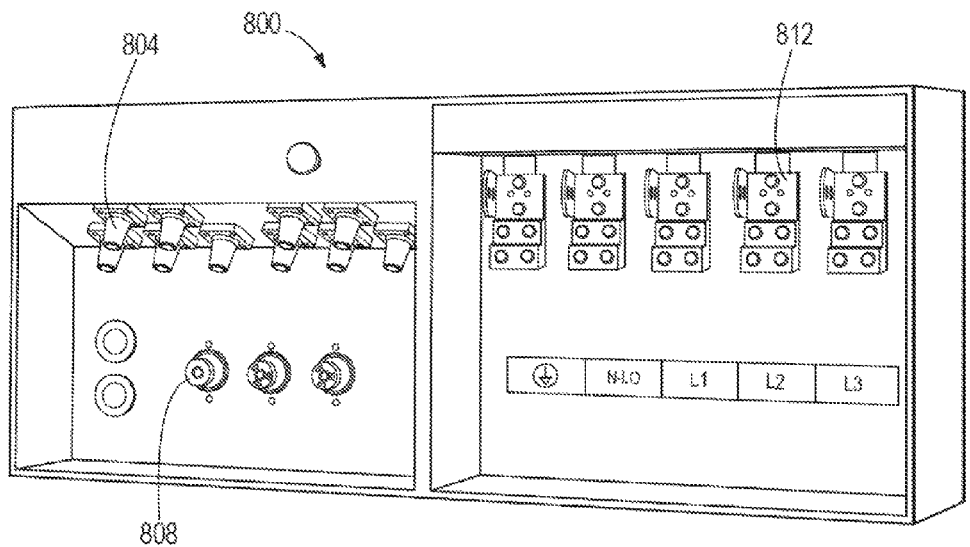
FIG. 8 illustrates an exemplary output panel of the power source shown in FIG. 1.

Once the generator 300 produces the desired power output and the protection device 600 verifies that the actual power output does not exceed the protection parameters, output power is provided for the necessary equipment through the output panel 800. The output panel 800 includes different connectors and interfaces to connect different types of equipment to the power source 100. As shown in FIG. 8, output panel 800 includes a cam lock panel 804, GFCI receptacles 808, and a terminal board 812. The different types of connectors 804, 808, 812 provide power at different ratings and equipment can be connected accordingly. In some embodiments, the output panel 800 also includes DC power outputs to provide DC power to different types of equipment.

Figure 9:
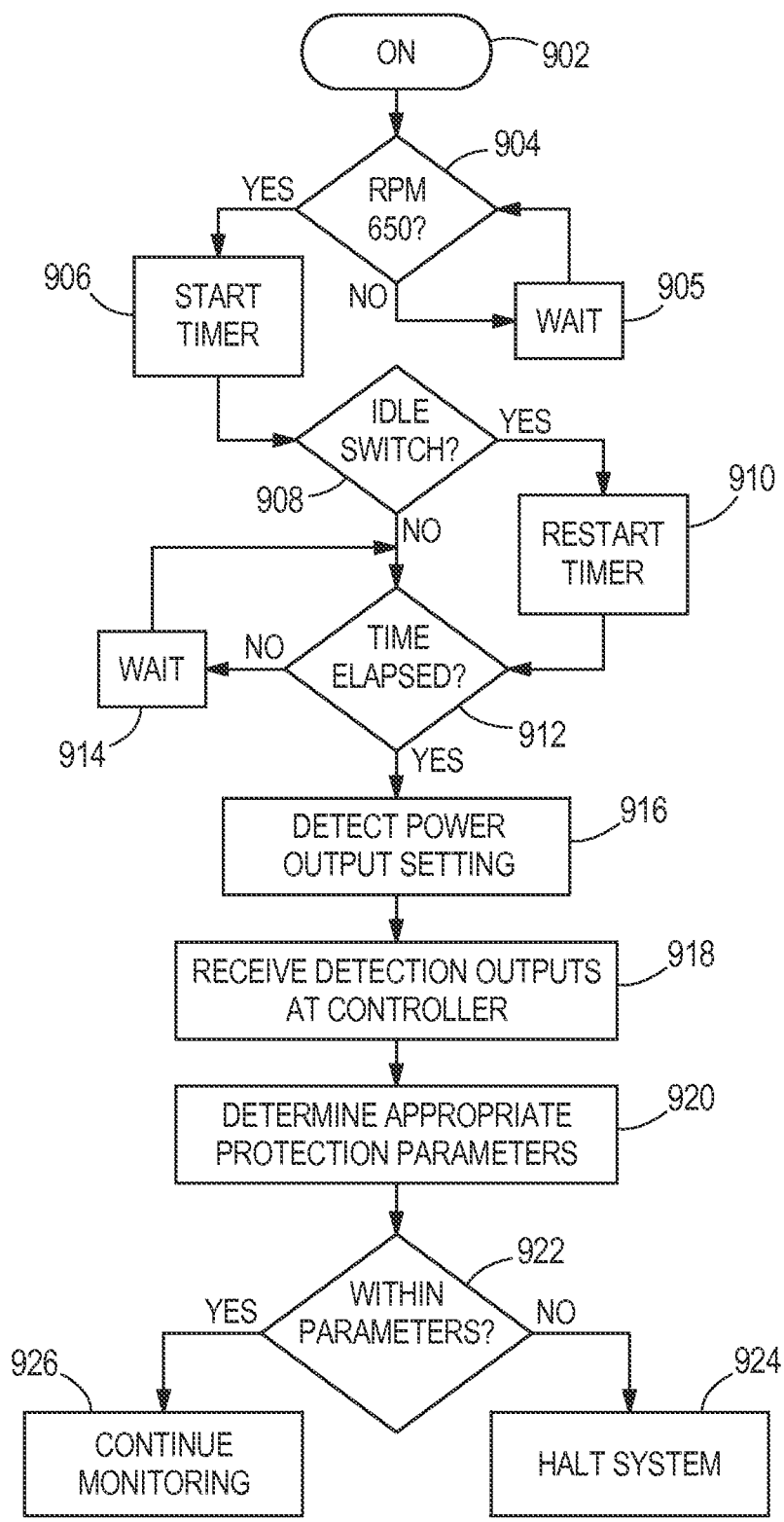
FIG. 9 is a flowchart illustrating a method of protecting the power source shown in FIG. 1.

FIG. 9 illustrates an exemplary method of properly protecting the power source 100. As shown in FIG. 9, the power source 100 is first turned on (block 902). The controller 550 then determines whether the revolutions per minute of the engine 200 exceed the predetermined threshold of, for example, 650 rpm (block 904). If the revolutions per minute of the engine 200 do not exceed the predetermined threshold, the controller 550 waits until the revolutions per minute of the engine 200 exceed the predetermined threshold (block 905). When the revolutions per minute of the engine 200 exceed the predetermined threshold, the controller 550 starts a timer to wait a predetermined amount of time before receiving the first and second detection outputs 750, 754 (block 906).

Once the timer has been started, the controller 550 determines whether the Run/Idle switch 506 has been activated (i.e., the power source 100 determined to operate in the Idle state) at block 908. If the Idle switch 506 has been activated, the controller 550 restarts the timer to provide sufficient time for the stator coils 306, 308, 310, 312, 314, 316 to be properly energized (block 910). Once the timer has been restarted, the controller 550 checks if the predetermined period of time has elapsed (block 912). If the Idle switch 506 has not been activated, the controller 550 proceeds directly to block 912 to determine if the predetermined period of time has elapsed. If the predetermined time period has not yet elapsed, the controller 550 waits (block 914) and then checks again (block 912). When the time period elapses, the detection circuit 700 detects a power output setting and generates the detection outputs 750, 754 (block 916) and the controller 550 receives the two detection outputs 750, 754 (block 918). The controller 550 then determines appropriate protection parameters to be used based on which configuration the stator coils 306, 308, 310, 312, 314, 316 are arranged in and what the power output is (block 920).

The controller 550 then determines whether the actual power output is within protection parameters (block 922). If the actual power output (voltage and current) is not within the protection parameters, the controller 550 commands the protection device 600 to halt the power source 100 to protect the power source 100 and the connected equipment (block 924). If the actual power output is within protection parameters, the power source 100 continues operation (i.e., production of electrical power) and the protection device 600 continues to monitor the operation of the power source 100 (block 926).

Thus, the invention provides, among other things, a detection circuit that automatically determines the selected power output for a multi-voltage generator. Various features and advantages of the invention are set forth in the following claims.

What is claimed is:

1. A power source comprising:
   a generator configured to receive mechanical energy and convert the mechanical energy to an electrical power output, the generator including a rotor and a stator, the stator having a first coil and a second coil, the first coil and the second coil selectively arranged in a first configuration to provide the electrical power output at a first level and in a second configuration to provide the electrical power output at a second level; and
   a detection circuit including a sensing relay, and configured to generate an indication output based on whether the first coil and the second coil are arranged in the first configuration or in the second configuration.

2. The power source of claim 1, further comprising a protection device coupled to the generator and configured to inhibit the generator from providing the electrical power output based on a protection parameter, wherein the protection parameter is determined based on the indication output from the detection circuit.

3. The power source of claim 2, wherein the protection device includes a circuit breaker configured to disconnect the generator from a load to inhibit the generator from providing the electrical power output when the protection parameter is exceeded.

4. The power source of claim 2, wherein the protection parameter is unique for each configuration in which the first coil and the second coil are selectively arranged.

5. The power source of claim 1, wherein the sensing relay is coupled to at least one of the first coil and the second coil;

and configured to detect a voltage from the at least one of the first coil and the second coil, and generate a signal based on the detected voltage.

6. The power source of claim 1, wherein the stator includes a third coil, a fourth coil, a fifth coil, and a sixth coil, wherein the first coil, second coil, third coil, fourth coil, fifth coil, and sixth coil are selectively arranged in the first configuration to provide the electrical power output at the first voltage level, the second configuration to provide the electrical power output at the second voltage level, and a third configuration to provide the electrical power output at a third voltage level.

7. The power source of claim 6, wherein the first coil, the second coil, the third coil, the fourth coil, the fifth coil, and the sixth coil are selectively arranged in the third configuration to selectively provide the electrical power output at the third voltage level and a fourth voltage level.

8. The power source of claim 1, wherein the sensing relay is a first sensing relay coupled to at least one of the first coil or the second coil to detect a first voltage and generate a first signal based on the detected first voltage, and wherein the detection circuit further includes a second sensing relay coupled to at least one of the first coil and the second coil to detect a second voltage and generate a second signal based on the detected second voltage.

9. The power source of claim 8, wherein the first sensing relay is further coupled to a switch, the switch configured to modify the first signal when the switch is activated.

10. The power source of claim 1, wherein the detection circuit includes a switch, the switch configured to modify a signal generated by the sensing relay when the switch is activated.

11. The power source of claim 10, wherein the switch is coupled to a voltage output selector that is movable between a first position in which the switch does not modify the first signal, and a second position in which the switch modifies the first signal.

12. A method of protecting a power source having a generator that includes a rotor and a stator, the stator including a first coil and a second coil, the method comprising:
receiving, at the generator, mechanical energy;
converting, by the generator, mechanical energy to an electrical power output;
selectively arranging the first coil and the second coil in one of the group including a first configuration and a second configuration;
providing, by the generator, the electrical power output at a first voltage level when the first coil and the second coil are arranged in the first configuration;
providing, by the generator, the electrical power output at a second voltage level when the first coil and the second coil are arranged in the second configuration; and
generating, by a detection circuit, an indication output based on whether the first coil and the second coil are arranged in the first configuration or in the second configuration, wherein the detection circuit includes a sensing relay.

13. The method of claim 12, further comprising determining a protection parameter based on the indication output from the detection circuit; and inhibiting, by a protection device, the generator from providing the electrical power output based on the protection parameter.

14. The method of claim 13, wherein inhibiting the generator from providing the electrical power output includes disconnecting, by a circuit breaker included in the protection device, the generator from a load to inhibit the generator from providing the electrical power output when the protection parameter is exceeded.

15. The method of claim 13, wherein the protection parameter is unique for each configuration in which the first coil and the second coil are selectively arranged.

16. The method of claim 12, wherein generating an indication output, by the detection circuit, based on whether the first coil and the second coil are arranged in the first configuration or in the second configuration, includes detecting, at the sensing relay, a voltage associated with at least one of the group including the first coil and the second coil, and wherein the sensing relay is coupled to at least one of the first coil and the second coil.

17. The method of claim 12, wherein the stator includes a third coil, a fourth coil, a fifth coil, and a sixth coil; wherein selectively arranging the first coil and the second coil includes selectively arranging the first coil, the second coil, the third coil, the fourth coil, the fifth coil, and the sixth coil in the first configuration to provide the electrical power output at the first voltage level, the second configuration to provide the electrical power output at the second voltage level, and a third configuration to provide the electrical power output at a third voltage level.

18. The method of claim 17, wherein selectively arranging the first coil, the second coil, the third coil, the fourth coil, the fifth coil, and the sixth coil in the third configuration provides the electrical power output at one of the third voltage level and a fourth voltage level.

19. The method of claim 12, wherein the sensing relay is a first sensing relay coupled to at least one of the group including the first coil and the second coil, and wherein generating an indication output based on which configuration the first coil and the second coil are arranged, includes detecting a first voltage, at the first sensing relay, from the at least one of the group including the first coil and the second coil; and generating, by the first sensing relay, a first signal based on the detected first voltage; detecting a second voltage, at a second sensing relay, from at least one of the group including the first coil and the second coil; and generating, by the second sensing relay, a second signal based on the detected second voltage, wherein the second sensing relay is coupled to at least one of the group including the first coil and the second coil.

20. The method of claim 19, wherein generating an indication output, by the detection circuit, based on which configuration the first coil and the second coil are arranged further includes modifying, by a switch, the first signal generated by the first sensing relay when the switch is activated.

21. The method of claim 12, wherein generating an indication output based on which configuration the first coil and the second coil are arranged, includes modifying, by a switch, a signal generated by the sensing relay when the switch is activated, wherein the sensing relay is also coupled to the switch.

22. The method of claim 21, wherein modifying the signal generated by the sensing relay includes receiving a user input via a voltage output selector, the user input indicative of a desired power output.

* * * * *